June 16, 1959 R. F. CASEY 2,891,151

REGENERATIVE DELAY CIRCUIT

Filed June 23, 1954

INVENTOR.
ROBERT F. CASEY

BY Darby & Darby

ATTORNEYS

United States Patent Office 2,891,151

Patented June 16, 1959

2,891,151

REGENERATIVE DELAY CIRCUIT

Robert F. Casey, Pompton Plains, N.J., assignor to Allen B. Du Mont Laboratories, Inc., Clifton, N.J., a corporation of Delaware Application June 23, 1954, Serial No. 438,795

12 Claims. (Cl. 250—27)

This invention consists of improvements in electrical circuits for instruments and other uses having a dual function which can be adjusted.

Heretofore it has been common to achieve delay in electrical circuits energized by a sweep voltage by applying the sweep voltage to the bias grid of an electron discharge device so that when the magnitude of the sweep voltage exceeds the grid bias the tube begins to conduct at a rate determined by the sweep speed or rate of voltage increase. Heretofore in order to achieve a more precipitous leading edge several stages of amplification have been necessary at low sweep speeds while at higher sweep speeds switching arrangements have necessarily been employed to disconnect the amplifiers. In addition to being expensive the use of amplifiers in this way introduces irregularities in the voltage wave form sometimes called "jitter," because the initiating potential was not always exactly the same, with the result that the differences were amplified into undesired irregularities in the wave form. This condition becomes progressively worse with increasing sweep speeds.

With these prior art difficulties in mind the following represent some of the more important objects of this invention:

(*a*) To provide a delayed acting circuit with a precipitous termination of operation;

(*b*) to provide a circuit which has a delayed response without the need of connecting and disconnecting amplifiers;

(*c*) to provide a delay circuit which is equally effective over a wide range of sweep frequencies;

(*d*) to provide a delay circuit of this type which has a smoother output voltage curve, that is which operates with reduced "jitter";

(*e*) to provide a delay circuit capable of being calibrated;

(*f*) to provide a delay circuit having a regenerative function in effecting delayed action;

(*g*) to provide more detailed advantages which will be apparent to those familiar with these systems.

Figure 1:
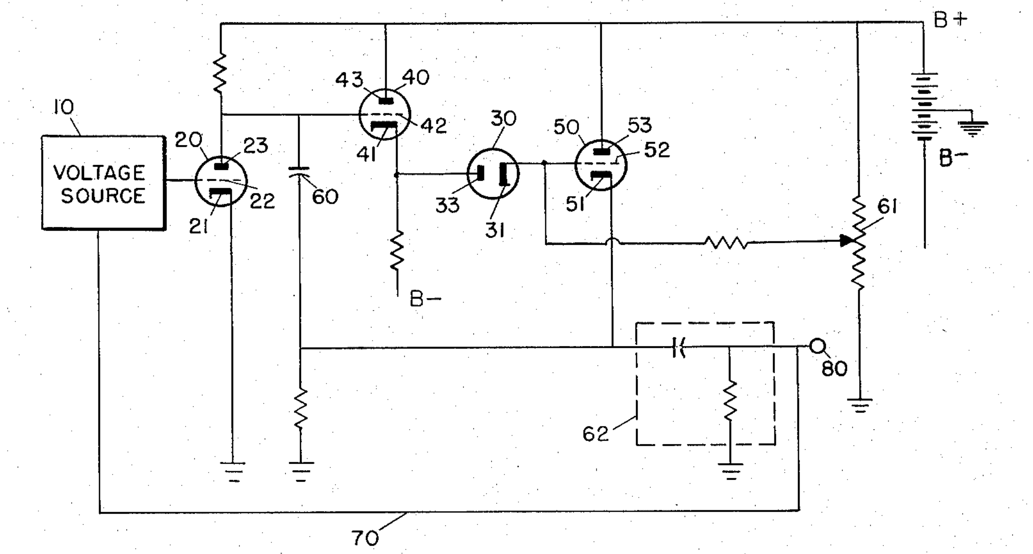
Figure 2:
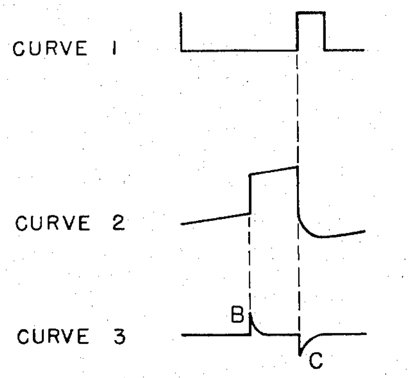

The subject matter of this invention has been illustrated diagrammatically in the attached drawings, of which Figure 1 is a diagrammatic, schematic view of a delay circuit in accordance with this invention; and Figure 2 shows the associated wave forms involved in the operation of the circuit of Figure 1.

To facilitate description of the operation of the system herein disclosed, the term "upvolting" is employed to signify potential increases which do not necessarily increase to a positive value.

The circuit as illustrated in Figure 1 consists of a source 10 of initiating or energizing voltage which may have a wave form by way of example such as shown by curve 1 of Figure 2. The voltage of this source is impressed upon the control grid 22 of a triode 20 having a plate 23 and a cathode 21 connected to ground. The anode 23 of the triode is connected directly to the grid 42 of a triode 40 whose cathode is connected to the negative side of a suitable potential source through a resistor, as shown. The cathode 41 is directly connected to the anode 33 of a rectifier 30, which as illustrated, but not necessarily, is of the vacuum tube type. The cathode 31 of the rectifier is directly connected to the control grid 52 of a triode 50. The anodes 23, 43 and 53 are conductively connected to the positive side of a suitable current source with the provision of a suitable resistor in the connection to the anode 23, as shown.

A capacitor 60, which is conventionally termed a sweep capacitor is connected at one side to the connection between the anode 23 and the grid 42, and at the other side to ground through a suitable resistor. A potentiometer 61 is connected from the positive side of the anode voltage source to ground, and its movable contact is conductively connected as shown to the conductive connection from the cathode 31 to the grid 52.

The grounded side of the sweep capacitor 60 is connected to the output terminal 80 through any suitable form of differentiator network 62, which as illustrated, consists of a capacitor in the connection with the output side connected to ground through a suitable resistor. The output terminal 80 is connected by the conductor 70 to the initiating voltage source 10 for a purpose to be later described. The cathode 51 of the triode 50 is conductively connected to the input side of the differentiator network 62, as shown.

In describing the operation of this circuit it will be assumed that the voltage applied to the grid 22 has the wave form of the curve 1 of Figure 2. The triode 20 is conventionally referred to as a "sweep-tube" because at cut-off it allows a positive going sweep voltage to appear at the sweep capacitor 60. Attention is also called to the fact that the triodes 40 and 50 are connected as cathode followers.

Upon consideration it will be seen that this circuit includes a regenerative loop which is formed by grid 42, cathode 41, rectifier 30, grid 52, cathode 51 and sweep capacitor 60. Regeneration takes place in the following manner. When a negative going initiating voltage is applied to the grid 22, anode 23 is upvolted, as is sweep capacitor 60 and grid 42, all of which are conductively connected as shown. Due to cathode follower connection, cathode 41 is upvolted as the voltage on grid 42 increases, and as a result so is the anode 33 of the rectifier 30.

It is noted that the cathode 31 of the rectifier is connected to the movable contact of the potentiometer or voltage divider 61 and so is biased in an amount determined by the adjustment thereof. Thus with a potential determined by the adjustment of the potentiometer 61, rectifier 30 becomes conductive, completing the regenerative loop through the triode 50 back to the sweep capacitor 60. As the now conductive rectifier 30 has a low forward resistance its cathode 31 is upvolted, raising the potential of grid 52 and upvolting cathode 51. This increase of potential is applied to the capacitor 60, reinforcing the regenerative loop and further upvolting the grid 42. Thus regeneration occurs delayed only by the setting of the voltage divider 61, that is by the amount of bias applied to the cathode 31 of the rectifier. The reinforcing of the voltage applied to the cathode 51 by regeneration occurs rapidly and to levels established by the circuit constants. In other words, regeneration, delayed only by the bias on the cathode 31, suddenly and quickly upvolts cathode 51 and other connected points in the circuit to the levels predetermined by circuit constants. It therefore follows that appreciable amplification is possible as an added advantage.

As soon as regeneration takes place the circuit comes into a steady or stable state until the initiating voltage drops back to its starting value. As the voltage drops back there results a reverse regeneration which is short lived because the rectifier 30 quickly cuts off current flow, allowing the sweep capacitor 60 to discharge normally through the sweep-tube 20.

The delayed output is preferably taken from the differentiator network 62, that is by the output terminal 80 in the form of sudden voltage changes which are commonly called "pips." In addition to the usual uses for the output of a delay circuit, these "pips" may be used to terminate the initiating pulse, thus permitting early reinitiation of the operation. The provision for this function is diagrammatically illustrated by the interconnection 70 between the output terminal 80 and the voltage source 10. Those skilled in the art will readily appreciate how the potential fed back through the lead 70 could be used to terminate or shorten the initiating pulse.

By reference to Figure 2 a still better understanding of this invention may be gleaned. As previously explained, curve 1 shows the wave form of the initiating negative going voltage applied to the grid 22. Curve 2 of Figure 2 shows the voltage wave form as applied both to capacitor 60 and grid 42 and the relative timing of the changes in wave form with changes in voltage as indicated by curve 1. As will be seen from curve 2, the sweep continues uninterruptedly for an interval which is determined by the setting of potentiometer 61. Curve 3 of Figure 2 shows the wave form of the output of the differentiator network 62, that is the output at the terminal 80.

It will be seen from a study of these wave forms that once the delay period has elapsed there is a precipitous change in the output. The end of the initiating voltage presents at the output terminal a change in the opposite direction, but this is a normal response unaffected by the circuit of this invention. As will be well understood in the art, the wave form of curves 2 and 3 can be controlled between the points B and C, if desired.

From the foregoing it is apparent that by means of this regenerative delay circuit the output rests during a delay period determined by the adjustment of the potentiometer which can be suitably calibrated for direct reading.

Those skilled in the art will appreciate that various modifications of the basic circuit may be used. By way of some example, the initiating voltage applied to the capacitor 60 may take the form of a sweep from a high impedance source. Alternately a positive going pulse could be applied to the cathode 21. Still another variant would involve the use of a negative sweep voltage fed through a Miller rundown circuit which is well known in the art.

It therefore follows that the specific embodiment of the invention employed herein for descriptive purposes will be subject to variations apparent to those skilled in the art. I desire therefore not to be limited to the illustrative embodiment herein employed for descriptive purposes, but only as required by the appended claims.

What is claimed is:

1. A delay circuit comprising: a regenerative circuit comprising a first electron discharge device having input and output electrodes, a second electron discharge device having input and output electrodes, a single normally non-conductive switch-like device connected between said output electrode of said first electron discharge device and said input electrode of said second electron discharge device, and a connection between said output electrode of said second electron discharge device and said input electrode of said first electron discharge device; means to apply an input signal of progressively changing level to said regenerative circuit; and means to predetermine the level of said input signal at which said switch-like device becomes conductive, whereby when said level is reached said regenerative circuit is completed to produce an output signal.

2. A delay circuit comprising: a regenerative circuit comprising a first cathode follower having input and output electrodes, a second cathode follower having input and output electrodes, a normally non-conductive switch-like device connected between said output electrode of said first cathode follower and said input electrode of said second cathode follower, and an impedance connected between said output electrode of said second cathode follower and said input electrode of said first cathode follower; means to apply an input signal of progressively changing level to said regenerative circuit; and means to predetermine the level of said input signal at which said switch-like device becomes conductive, whereby when said level is reached said regenerative circuit is completed to produce an output signal.

3. A delay circuit comprising: means to produce a sawtooth input waveform, said means including a capacitance; a regenerative circuit comprising a first cathode follower having input and output electrodes, a second cathode follower having input and output electrodes, a normally non-conductive rectifier having one electrode thereof connected to the output electrode of said first cathode follower and the other electrode thereof connected to the input electrode of said second cathode follower, and said capacitance connected between said output electrode of said second cathode follower and said input electrode of said first cathode follower; means to apply said sawtooth waveform to said input electrode of said first cathode follower; and means to predetermine the level of said input signal at which said rectifier becomes conductive, said means comprising a variable potential applied to one of said electrodes of said rectifier.

4. The circuit of claim 3 including means to obtain an output signal from said regenerative circuit, said means comprising a differentiating circuit to provide an output signal in the form of pips.

5. In a circuit of the type described the combination including: three multi-electrode electron discharge devices each including a cathode, a grid, and an anode; a source of initiating voltage connected to the grid of a first one of said devices, the anode of said first device being connected to the grid of a second of said devices, the cathode of said second device being connected to the grid of the third of said devices through a rectifier having a cathode; a source of operating potential having a positive terminal, a negative terminal, and an intermediate terminal; a connection including a resistor between said positive terminal and said anode of said first device; a connection between said positive terminal and the anodes of said second and said third device; a connection between said cathode of said first device and said intermediate terminal; a connection including a resistor between said cathode of said second device and said negative terminal; a connection including a resistor between said cathode of said third device and said intermediate terminal; an adjustable voltage source connected to the cathode of said rectifier; a capacitor connected between the anode of said first device and the cathode of said third device; an output circuit connected to said capacitor; said second and third devices being connected as cathode followers and with their associated circuits forming a regenerative loop including said capacitor.

6. In the combination of claim 5, a connection from said output circuit to said voltage source.

7. In the combination of claim 5, said voltage source for the cathode of the rectifier comprising an adjustable voltage divider.

8. An adjustable regenerative delay circuit comprising; a source of initiating voltage; an impedance element across which said initiating voltage appears; a source of operating potential having a positive, a negative, and an intermediate terminal; a regenerative loop having a first electron discharge device connected as a cathode follower, said electron discharge device having at least an anode connected to said positive terminal, a cathode connected through a resistor to said negative terminal, and an input electrode connected to said impedance element, a rectifier having an anode connected to the cathode of said first electron discharge device, and a cathode, a second electron discharge device connected as a cathode follower having at least an anode connected to said positive terminal, a cathode connected through a resistor to said intermediate terminal, an input electrode connected to said cathode of said rectifier, said impedance element connected between said cathode of said second electron discharge device and said input electrode of said first electron discharge device; rectifier biasing means connected to the cathode of said rectifier; and an output circuit connected to the cathode of said second electron discharge device.

9. The circuit of claim 8 wherein said rectifier biasing means comprises an adjustable voltage divider.

10. The circuit of claim 9 wherein said initiating voltage is a positive-going sawtooth voltage.

11. The circuit of claim 9 wherein said output circuit is a differentiator network.

12. The circuit of claim 11 having in addition a connection between said output circuit and said source of initiating voltage.

References Cited in the file of this patent

UNITED STATES PATENTS

| | | |
|---|---|---|
| 2,463,969 | Hulst | Mar. 8, 1949 |
| 2,540,923 | Williams | Feb. 6, 1951 |
| 2,553,284 | Sunstein | May 15, 1951 |
| 2,555,440 | Gilbert | June 5, 1951 |
| 2,570,875 | Sink | Oct. 9, 1951 |
| 2,597,353 | MacNichol | May 20, 1952 |
| 2,726,329 | Henderson | Dec. 6, 1955 |
| 2,735,007 | McCurdy | Feb. 14, 1956 |
| 2,806,139 | Leclerc | Sept. 10, 1957 |